United States Patent [19]

Morgan, Jr. et al.

[11] 4,106,186
[45] Aug. 15, 1978

[54] BORON NITRIDE INSULATING MATERIAL

[75] Inventors: Chester S. Morgan, Jr., Oak Ridge; O. Burl Cavin, Knoxville; Reginald W. McCulloch, Concord, all of Tenn.; David L. Clark, Clearwater, Fla.

[73] Assignee: The United States of America as represented by the United States Department of Energy, Washington, D.C.

[21] Appl. No.: 744,494

[22] Filed: Nov. 24, 1976

[51] Int. Cl.$^2$ .............................................. H01C 1/03
[52] U.S. Cl. .................................... 29/616; 219/523; 219/544; 264/112; 264/272; 264/325; 338/238; 338/248
[58] Field of Search ................... 338/238, 242, 248; 219/523, 544, 552; 264/272, 325, DIG. 69, 118; 29/613, 616, 619

[56] References Cited

U.S. PATENT DOCUMENTS

| | | | |
|---|---|---|---|
| 3,898,431 | 8/1975 | House et al. | 219/544 |
| 4,001,760 | 1/1977 | Howie et al. | 338/238 |

Primary Examiner—Robert F. White
Assistant Examiner—John A. Parrish
Attorney, Agent, or Firm—Dean E. Carlson; Stephen D. Hamel; Allen H. Uzzell

[57] ABSTRACT

High temperature BN-insulated heaters for use as fuel pin simulators in reactor thermal hydraulic test facility studies comprise a cylindrical housing and a concentric heating element disposed within the housing and spaced apart from the housing to define an annular region therebetween. The annular region contains BN for providing electrical resistance and thermal conductivity between the housing and the heating element. The fabrication method of this invention comprises the steps of cold pressing BN powder at a pressure of 20 to 80,000 psig and a dwell time of at least 0.1-3 seconds to provide hollow cylindrical preforms of suitable dimensions for insertion into the annular region, the BN powder having a tap density of about 0.6-1.1 g/cm$^3$ and an orientation ratio of at least about 100/3.5. The preforms are inserted into the annular region and crushed in place.

11 Claims, 4 Drawing Figures

BORON NITRIDE INSULATING MATERIAL

BACKGROUND OF THE INVENTION

This invention was made in the course of, or under, a contract with the United States Energy Research and Development Administration.

It relates to the fabrication of high temperature heaters used to simulate fuel assemblies in safety and thermal hydraulic studies of nuclear reactor systems. Specifically, this invention relates to a fabrication method for cartridge-type heaters comprising a cylindrical metal housing containing a concentrically oriented heating element. The heating element is separated from the metallic housing by boron nitride to provide both electrical insulation and thermal conductivity. The heating element may be of any configuration which can be disposed substantially concentric to the cylindrical housing defining an annular region therebetween, such as solid rod or hollow rod, or a helically wound filament such as ribbon or wire. Typically, conventional electric connections are provided at one end of the heater for passing an electric current through the heating element. Sometimes the heating element is grounded on the opposite end. The metallic housing can be of any corrosion resistant alloy such as type 316 stainless steel. The heating element can be of any high temperature metal having high electrical resistance such as Pt-8 wt.% W and Nichrome V (Ni-20 Wt.% Cr).

The method of our invention is largely described herein with respect to heaters having a helically wound ribbon heating element. It will be apparent to those skilled in the art that our fabrication method as described herein is also useful for other heaters having a cylindrical housing and concentrically oriented heating element, such as rods or helically wound wires. For purposes of this invention, a concentric heating element is one oriented such that in a cross section of the heater taken perpendicular to the longitudinal axis, the heating element and housing would be seen as concentric circles.

During fabrication of heaters having ribbon elements, the heating element is usually wound around a mandrel which is removed leaving a helically wound element having a central longitudinal cavity. For fuel pin simulation studies, the winding of the heating element is controlled during fabrication in such a manner as to provide the desired heat flux during operation. For example, a uniform heat flux may be provided by a heating element of constant width wound with a constant number of turns per unit length. A predictably non-uniform heat flux may be provided by varying the number of turns or by varying the width of the element such as is described in commonly assigned U.S. Pat. No. 3,912,908 issued to Clark et al., Oct. 14. 1975 for "Electric Cartridge-Type Heater For Producing A Given Non-Uniform Axial Power Distribution" which is herein incorporated by reference.

In cartridge-type heaters of the type described above, the heating element is positioned within the concentric cylindrical housing providing an annular region therebetween. For electrical insulation, both the annular region and the central longitudinal cavity of the heating element contain boron nitride powder. In heaters used for fuel pin simulation, uniform thermal conductivity in the annular region between the housing and heating element is of critical importance. The external heat flux and the internal temperature of the heating element depend on this thermal conductivity. Variations in thermal conductivity cause the external heat flux to vary axially and/or circumferentially thus affecting the accuracy of the experiment. Low thermal conductivity results in abnormally high internal element temperatures and thus decreased heater lifetime and often premature failure of an expensive test bundle.

PRIOR ART

In the prior art, the method of providing insulation for cartridge-type heaters was to partially fill the spaces with boron nitride powder and tamp the powder. Boron nitride density of about 60–65% theoretical was obtainable by tamping. The tamping tools had to fit closely within the central cavity and the annular space to ensure uniform powder distribution. Oftentimes, bits of metal would be abraded off of the tool, the housing, or the heating element and be incorporated within the insulation. After powder filling and tamping was completed, the housing was sealed and then swaged to further densify the tamped BN and cause it to fill the spaces between the coils of the heating element and to provide good thermal contact between the metal surfaces and the boron-nitride insulating material. Good contact between the insulating material and the metal surfaces is required because the boron nitride functions to provide both electrical resistance and thermal conductivity. Swaging to about 12% reduction in diameter (6–8% elongation) was normally required.

There were several problems associated with the prior art method of powder filling and tamping. The amount of impurities in the boron nitride powder was increased due to metal inclusions from the abrading of metallic surfaces during tamping. High purity powder is required because impurities adversely affect the electrical insulation properties of the BN. Another problem was that shear stresses developed during the swaging operation caused the heating element to twist, changing the number of turns per unit length and causing the heat flux profile to vary in an unpredictable manner. Fuel pin simulators are sometimes equipped with thermocouples having thermal elements mounted on the interior surface of the housing. Heater elongation of 6–8% during swaging made it difficult to maintain close tolerances on thermocouple junction locations and even caused separation of the thermocouples. In addition, the powder tamping method did not assure the proper positioning of the heating element within the housing so oftentimes off-center heaters were produced having reduced insulation gaps and variations in the heat flux profile design.

SUMMARY OF THE INVENTION

It is an object of this invention to provide a method for fabricating a boron nitride-insulated cylindrical cartridge heater with a substantially increased thermal conductivity across the boron nitride insulating material.

It is a further object to provide a method for fabricating a boron nitride-insulated heater with a substantially uniform thermal conductivity across the boron nitride insulating material (less than ± 2% variation from the mean value).

It is a further object to provide a method which reduces the problem of metallic inclusions within the insulation due to abrasions during tamping.

It is a further object to provide a method which substantially reduces the amount of swaging required, thereby reducing the axial variation from the design heat flux profile and increasing the accuracy of dimensional tolerance on thermocouple junctions.

These and other objects are accomplished according to our invention in a method for fabricating an electric heater comprising a cylindrical housing and a concentric heating element disposed within said housing and spaced apart from said housing to define an annular region therebetween, said annular region containing boron nitride for providing electrical resistance and thermal conductivity between said housing and said heating element, said fabrication method comprising the steps of:

(a) cold pressing boron nitride powder at a pressure of 20–80,000 psig and a dwell time of at least 0.1–3 seconds to provide hollow cylindrical preforms of suitable dimensions for insertion into said annular region, said boron nitride powder having a tap density of about 0.6–1.1 $g/cm^3$ and an orientation ratio of at least about 100/3.5;

(b) inserting said preforms into said annular region; and (c) crushing said preforms in place. Individually crushing the preforms in place adds to the uniformity of thermal conductivity. Further densification of boron nitride and more uniform thermal conductivity is achieveable if the heaters are deformed to a reduction in diameter such as by swaging or drawing. Powder having the proper orientation ratio is provided by de-agglomerating commercially available powder and settling through an organic suspension medium. Powder having the proper tap density is provided by prepressing commercially available powder into compacts which are then broken up to provide a more easily cold-pressed powder.

BRIEF DESCRIPTION OF THE DRAWINGS

FIG. 2 represents the axial temperature profile of an unswaged heater.

FIG. 3 represents the axial temperature profile of the same heater swaged to a 2.7% reduction in diameter.

FIG. 4 represents the axial temperature profile of the same heater swaged to a total reduction of diameter of 4.2%.

DETAILED DESCRIPTION

Figure 1:
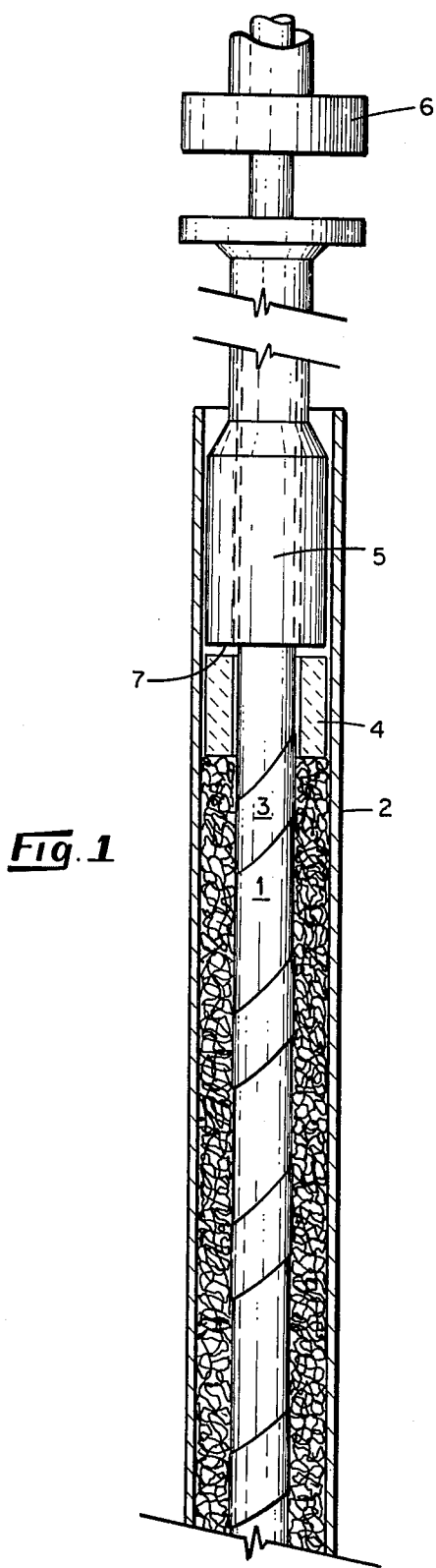
FIG. 1 is a cross sectional view of a cylindrical cartridge-type heater being loaded according to our method.

Our invention entails the fabrication and use of crushable boron nitride preforms in the fabrication of cartridge-type heaters. An important aspect of our invention is the method of fabricating boron nitride preforms having a preferred particle orientation to enhance the thermal conductivity in the radial direction. These preforms can be inserted within the cavities of a heater, crushed in place to cause BN to expand against the surfaces of the housing and heating element and between turns of a helically wound heating element to provide good thermal contact. Contact can be further improved with minimal swaging and the preferred orientation of the BN powder, which results in higher radial thermal conductivity, is substantially retained. The subject fabrication method, carried out with preforms having a uniform density ($\pm 2\%$) will provide a heater with uniform BN insulation density in the annular region and uniform thermal conductivity along the length of the heated section, thus causing minimal perturbation of the heat flux profile. Electrical resistance across the BN insulation is good because of reduced metal impurities and improved concentricity. While our method is described with respect to a particular type of cartridge heater, it will be apparent to those skilled in the art that crushable or deformable boron nitride preforms prepared according to our process may be used for a variety of insulation applications.

The fabrication of cartridge-type heaters according to our method provides more reproducible heaters than the prior art method of powder filling and tamping, and substantially reduces the amount of swaging necessary for the assembled heaters. The crushing operation, now permitting the use of a loosely fitting tool, essentially eliminates the problem of abraded metal inclusion associated with the use of necessarily tight-fitting tamping tools needed for prior art powder tamping.

When heaters with a heating element having a central longitudinal cavity are fabricated according to our fabrication method, inner preforms are made in the shape of solid or hollow cylinders to fit within the central longitudinal cavity of the heating element and outer preforms are made in the shape of hollow cylinders to fit around the heating element within the annular region defined between the heating element and the housing. The outer preforms are very critical to the performance of the heater since they form the electrical insulation between the heating element and the housing. For example, in present fuel pin simulation studies for liquid metal fast breeder reactors, a potential of more than 300 volts is applied across a 0.020 in. minimum thickness of boron nitride within a fuel pin simulation heater. A measure of improvement in performance over the prior art is achievable if outer preforms are used according to our invention only in the annular region, with the central cavity being filled by conventional techniques such as hot pressed preforms or tamped powder. Greater uniformity is achieved and less swaging is required when crushable preforms are used for providing both the inner and outer insulation according to our invention. In addition, the use of outer preforms in the annular region facilitates centering of the heating element during heater assembly.

An important aspect of our invention lies in the discovery that preforms can be made according to a cold pressing process, which have a density of at least about 70% theoretical, a preferred particle orientation, and which are easily crushable into powder which recombines (e.g., upon swaging or drawing in a cartridge-type heater) to retain preferred orientation and provide high uniform annular thermal conductivity and uniform density. This beneficial behavior of our cold pressed preforms was quite unexpected based upon prior experience with techniques of hot-pressing boron-nitride powder. For example, the hardness (compressive strength) has been found to vary considerably in hot pressed material and uniform crushing is impossible to ensure. In addition, the density of hot pressed material has been found to vary considerably and there is no known method of eliminating density variations after hot pressed material is crushed. In addition, hot pressed BN preforms must be machined from larger pieces of hot pressed material and might require closer tolerances than cold pressed preforms prepared according to our process. When heaters containing hot pressed preforms are swaged, multiple passes and an increased amount of reduction are required to ensure crushing and recombination. Discontinuities in BN densities can be expected at the junctions between adjacent preforms. Furthermore, impurities tend to become localized in hot pressed BN reducing the insulation properties of the material. There is no known tendency for particles of hot pressed BN to orient themselves in the proper direction. With radial pressure applied (as in swaging) orientation of the crystallites would be in the wrong direction.

In order to provide preforms for use in our process, it is necessary to cold press BN powder having a preferred particle orientation and a tap density of at least 0.6 g/cm$^3$. When the particles have a preferred orientation, they slide along the basal planes during pressing to give a preferred particle orientation with the basal planes extending in the radial direction in the heaters. The degree of particle orientation of boron nitride is determinable by x-ray diffraction using the ratio of the intensity of the basal plane reflection (002) to the intensity of the perpendicular plane reflection (100) herein termed the "orientation ratio." The ASTM standard for unoriented powder is:

$$I\ (002)/I\ (100)\ =\ 100/16$$

Our process requires BN powder with an orientation ratio no larger than (100/3.5). The tap density of the powder prior to preform pressing is the density of the powder when it is poured into the pressing die. The tap density of the powder determines the amount of movement of the pressing die needed to achieve the final preform size at specified density and thus the length of the die cavity. For example, if the powder had a tap density of 0.5 g/cm$^3$ a 2.0 in. die cavity and 1.5in. movement is needed. The tap density should be as high as practical for efficient die pressing. The tap density required for our method is within the range of about 0.6–1.1 g/cm$^3$. BN powder having a tap density of less than about 0.6g/cm$^3$ cannot be pressed into crushable preforms due to excessive binding of pressing dies.

If BN powder having the desired particle orientation and tap density is not available, unoriented BN powder can be treated to provide powder suitable for pressing preforms. The as-received BN powder is first given a preferred particle orientation by de-agglomerating the powder such as by ball-milling. This may be readily accomplished by ball-milling as-received powder in a suspension medium such as hexane for sufficient time to provide powder having the desired orientation ratio. The grinding operation breaks up agglomerates into particles which are thin platelets having predominantly basal planes as their larger surfaces and thus have greater ability to reorient during subsequent cold pressing. For example, orientation ratios suitable for our process may be obtained by ball-milling BN powder (such as TS-1325 commercially available from Union Carbide Corporation) for at least about 3–16 hours in hexane. Where a very high orientation ratio is desired, the non-agglomerated ball-milled powder is settled through an organic liquid prior to pressing. Suitable organic liquids include volatile hydrocarbons such as hexane, heptane, benzene, etc. with hexane preferred.

As a preferred method for providing oriented powder which is more flowable and easier to add to the die, the following powder treatment may be carried out which does not significantly interfere with the powder orientation. The non-agglomerated powder is slurried in hexane containing dissolved camphor equivalent to 1 wt.% of the BN weight. The slurry is filtered and the remaining hexane is evaporated from the BN powder. A portion of the camphor remains adsorbed on the BN powder particles. Camphor functions as a lubricant and can be replaced by other lubricants, steric acid, maleic acid, etc.

To provide powder of the proper tap density for our process, it will usually be necessary to increase the density (normally about 0.4 g/cm$^3$) of the as-received powder. Powder having the preferred orientation (e.g. after ball-milling, settling, etc.) is cold pressed at 1000–10,000 psig (2000–40000 psig preferred) into a compact which is then fragmented into the proper particle size for easy die loading such as by fracturing and forcing through a 20–30 mesh screen. It was found that the relatively low pressure prepressing step does not prevent the individual BN particles from rearranging during the preform pressing step to provide the preferred orientation. The dwell time is not critical for the prepressing step.

After BN having the proper orientation and tap density is provided, the powder is then cold pressed in a conventional powder press into the desired preform shape at a pressure of from about 20,000 to 80,000 psig for a dwell time of at least about 0.1 to 3.0 sec. to provide a preform having a density of 1.6 to 2.1 g/cm$^3$ (70–93% theoretical). The optimum is 50,000 psig since little improvement in density is obtained above this value. The dwell time of at least about 0.1 to 3.0 sec. is necessary to allow air or other gas to escape from the cold pressed powder before the pressure is released. When outer annular preforms are produced for cartridge heaters, the length-to-wall thickness ratio is ordinarily about 15 to 1. When inner solid preforms are produced for the central cavity, the length-to-diameter ratio is preferably about 3 to 1. The preferred density is 70–93% theoretical. Of course, it is within the skill of the art to vary these values as dictated by the particular fabrication parameters, press capabilities, etc.

For purposes of our process, "cold pressing" refers to pressing at temperatures substantially below the usual temperatures used for hot pressing boron nitride, around 1500° C. The preferred temperature for our cold pressing is at room temperature, but the pressing could be carried out at temperatures as high as about 1000° C. without deleterious effects on the advantageous properties of our boron nitride preforms. Accordingly, the term "cold pressing" as used herein refers to pressing at temperatures below about 1000° C.

If desired, a variety of lubricants may be used during the cold pressing step such as stearic acid in acetone, stearic acid in carbon-tetrachloride or camphor in acetone. The use of lubricants increases the density uniformity and the length of preform attainable for a particular pressing pressure. Also, the possibility of pressing die binding or galling is reduced.

The final properties of the preforms depend upon the particle size of the original BN powder after grinding or milling. Smaller individual crystallites give better basal plane radial orientation and larger particles provide for greater length-to-thickness or length-to-diameter ratios. For fuel pin simulation heaters the preferred BN particle size (after ball milling) is about 1 micron. This should provide a pressed preform with a length-to-thickness ratio of about 15 to 1, and an orientation ratio within the range of about (100/0.5 to 100/2.0). The higher the orientation ratio (i.e., the lower the denominator) the higher the thermal conductivity. An orientation ratio as high as (100/0.36) has been obtained in our process.

The concept of using crushable BN preforms for insulating cartridge-type heaters permits the use of a crushing tool with a looser fit than the tamping tool used for powder filling. The crushing tool is therefore unlikely to abrade metal particles from the heater surface during the crushing operation. The preforms expand radially upon crushing, filling the annular region between the heating element and the housing. The crushable cold pressed preforms of our process are particularly advantageous for use in fabricating heaters having heating elements comprising a helically wound filament such as a ribbon or wire, because the preferred orientation of the BN with the basal planes in the radial direction facilitates the movement of BN powder to the spaces between the turns upon crushing and also upon swaging or drawing. Substantially less swaging is required when BN insulation is provided according to our method, only about 0.5% elongation. Accordingly, the problem of heating element twisting and thermocouple movement during swaging is practically eliminated. It has been found that the outer preforms should be individually inserted into the annular cavity and individually crushed in order to provide satisfactory contact with the walls of the housing. The crushing should be accomplished with an energy density which will not cause permanent heating element deformation due to the crushing energy, and which is sufficient to provide the surface contact necessary to give uniform thermal conductivity with limited swaging. An energy density of about 5-50 ft. lbs/in$^2$ has been found to provide adequate crushing. When the heating element is hollow, such as a tube or helically wound ribbon or wire, and inner preforms are used, they need not be individually crushed. They may be inserted in multiples of 2 or more and can be crushed during the swaging operation. Of course, they may be crushed in place if desired.

DESCRIPTION OF THE PREFERRED EMBODIMENT

To illustrate the fabrication method of our invention the following embodiment for a heater having a helically wound heating element is presented. It is not intended to be limiting, the invention being limited only by the claims.

Boron nitride powder TS-1325 available from Union Carbide Corporation is ball-milled for about 3 hours (using ½ inch alumina balls) with a hexane suspension agent and then settled in a 1% camphor in hexane solution (1wt.% camphor with respect to BN) and filtered. The excess hexane is evaporated leaving BN powder with adsorbed camphor. The powder is poured into a conventional press and pressed at 3000 psi for about 5 seconds into one-half to 2 inch cylinders. These cylinders are broken up into coarse powder having a tap density of about 0.8 g/cm$^3$. This yields a powder which has good orientation properties and can be easily loaded into dies. The hexane and camphor treatment lubricates the powder making it less likely to cause die lock-up during pressing. The coarse powder is pressed at 50,000 psi with a dwell time of about 2 sec. to provide a hollow cylindrical preform of 1.91 g/cm$^3$ density (85% theoretical) and 0.6 in. length, and 0.208 in. o.d., and 0.040 in. thickness.

Similarly, in a different press, coarse powder is pressed into solid cylindrical preforms for the central longitudinal cavity and having a length of 0.5 in. and a diameter of 0.106 in. and a density of 1.80 g/cm$^3$ (80% theoretical).

The preforms are maintained in a vacuum for 2-16 hours at about 200° C to remove camphor and then baked for about 16 hours in anhydrous ammonia at 925° C to remove or reduce carbon and oxygen and other impurities. The preforms should be stored in dry inert atmosphere until used in fabricating heaters.

The fabrication of heaters is described with reference to FIG. 1. The wound heating element ribbon 1 of Nichrome V material and having a 0.109 in. i.d. and a 0.125 in. o.d. is cut to the desired length and the electrical connecting terminal (not shown) is attached to one end. A hollow preform should be passed over the heating element to ensure adequate tolerance. Solid preforms 3 are inserted three or four at a time into the central cavity within the heating element. After the central cavity is filled with preforms the final electrical connecting terminal (not shown) is attached to provide an active component assembly. This assembly is baked at about 400° F for one hour in a dry inert gas atmosphere or vacuum to remove volatile impurities and moisture. The assembly is then inserted into the metallic housing 2 having a 0.210 i.d. forming an annular region therebetween, and a bottom tamping foot (not shown) is attached to the bottom end of the housing. The housing and assembly are clamped in a vertical direction. The hollow preforms 4 are baked at 250° F or more for one hour to ensure dryness. The hollow preforms have an o.d. of 0.208 in. to fit snugly within the annular region. Each hollow preform is inserted into the annular cavity individually and carefully pushed into position with the annular face 7 of the crushing tool 5. The crushing tool has an o.d. of 0.195 in. and a thickness of 0.028 in. A one pound weight 6 is dropped three inches to crush each preform. The preforms for the annular region are individually inserted and crushed individually because it has been found that if more than one preform is crushed at a time, poor thermal contact is made with the surface of the housing. The contact surface area of the preform is 0.02 in.$^2$ so the energy density of the crushing blow is 11.8 ft.-lbs/in$^2$. The housing is sealed with polytetrafluoroethylene plug and swaged in a two or more step operation to provide a uniform thermal conductivity across the BN within the annular region ($\pm$ 2% variation from the mean).

Of course, it will be readily appreciated by those skilled in the art that the particular dimensions of the heater components, preforms, and crushing tool are not the critical aspect of the invention. They are presented only for the purpose of demonstrating acceptable tolerances for making fuel pin simulators. The tolerances may be varied within limits readily assertainable by routine experimentation.

Figure 2:
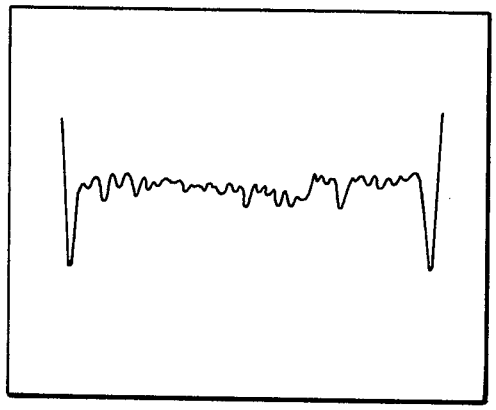
FIGS. 2, 3 and 4 are a series of infrared scans showing the uniformity of heat flux profile achieved in cartridge-type heaters fabricated according to our process.
Figure 3:
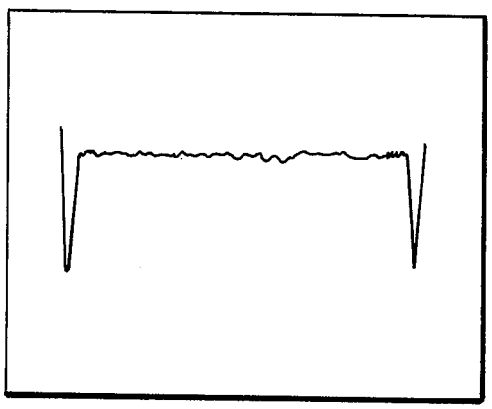
Figure 4:
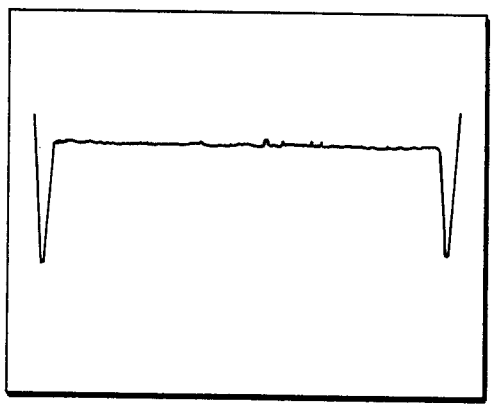

FIGS. 2, 3 and 4 are infrared scans depicting the variations of axial heat flux profile with swaging of a fuel pin simulation heater according to the preferred embodiment of our method. The heating element was a solid 0.125 in. diameter Inconel rod. The housing was 0.260 in. o.d. stainless steel tubing. The BN preforms for the annular region were prepared according to the procedure in the preferred embodiment herein with an initial density of about 80% theoretical. The preforms were inserted and crushed one at a time. The finished heater was plugged at both ends with polytetrafluoroethylene. The heater was infrared scanned and the result is depicted in FIG. 2. The scan shows a variation in the axial temperature profile of ± 20%. Since the heat generation from the Inconel rod is uniform, the variation is due to density and thus thermal conductivity variations in the heater annulus. The heater was then swaged 7 mils (2.7% reduction) and infrared scanned a second time, as depicted in FIG. 3. The 2.7% reduction in diameter increased the BN density to about 89% theoretical, caused a 0.32% elongation, and reduced the axial temperature variations to ± 4%. The heater was then swaged another 1.5% reduction which increased the BN density to about 94% theoretical and caused an additional elongation of 0.24%, providing a completely uniform axial temperature profile (less than ± 2% variation from the mean) indicating uniform BN density and uniform thermal conductivity of BN within the annular region (less than ± 2% variation from the mean). Accordingly, in a preferred embodiment of our fabrication process it is preferred that after the BN preforms are crushed in place, that the electric heater be swaged to a sufficient extent to cause boron nitride within the annular region to have sufficiently uniform thermal conductivity (no more than ± 2% variation from the mean.)

Of course, it can be readily appreciated that the heaters may be used without swaging and that the densification of BN achieved by swaging may likewise be achieved by drawing.

What is claimed is:

1. A method for fabricating an electric heater comprising a cylindrical housing and a concentric heating element disposed within said housing and spaced apart from said housing to define an annular region therebetween, said annular region containing boron nitride for providing electrical resistance and thermal conductivity between said housing and said heating element, said fabrication method comprising the steps of:
   (a) cold pressing boron nitride powder at a pressure of 20–80,000 psig and a dwell time of at least 0.1–3 seconds to provide hollow cylindrical preforms of suitable dimensions for insertion into said annular region, said boron nitride powder having a tap density of about 0.6–1.1 g/cm$^3$ and an orientation ratio of at least about 100/3.5;
   (b) inserting said preforms into said annular region; and
   (c) crushing said preforms in place.

2. The method of claim 1 in which said preforms are individually inserted into said annular region and individually crushed in place.

3. The method of claim 1 in which said cold pressing step is carried out at room temperature.

4. The method of claim 1 in which said boron nitride powder having a tap density of about 0.6–1.1 g/cm$^3$ is provided by a method comprising the steps of cold pressing boron nitride powder 1,000–10,000 psig to provide a compact, and fragmenting said compact into the proper particle size to provide said tap density.

5. The method of claim 1 in which said boron nitride powder having an orientation ratio of at least about 100/3.5 is provided by de-agglomerating unoriented boron nitride powder.

6. The method of claim 5 further comprising settling said de-agglomerated boron nitride powder through an organic liquid.

7. The method of claim 6 wherein said organic liquid is selected from the group consisting of hexane, heptane and benzene.

8. The method of claim 1 in which said concentric heating element is a helically wound metal filament, whereby during said crushing step, boron nitride powder is caused to move into spaces between turns of said helically wound filament.

9. The method of claim 1 further comprising after said crushing step, swaging said electric heater to a sufficient extend to cause boron nitride within said annular region to have substantially uniform thermal conductivity of ± 2% variation from the mean value.

10. The method of claim 1 in which said hollow cylindrical preforms have a density of 1.6 to 2.1 g/cm$^3$.

11. The method of claim 9 in which said hollow cylindrical preforms have a density of 1.6 to 2.1 g/cm$^3$.

* * * * *